United States Patent [19]

Meyerhoefer et al.

[11] Patent Number: 4,980,909

[45] Date of Patent: Dec. 25, 1990

[54] PROTECTOR MODULE FOR LAMINAR TYPE TELEPHONE BLOCKS

[75] Inventors: Carl Meyerhoefer, Dix Hills; Peter Visconti, Baldwin; Michael Fasano, Huntington, all of N.Y.

[73] Assignee: Porta systems Corp., Syosset, N.Y.

[21] Appl. No.: 430,250

[22] Filed: Nov. 2, 1989

[51] Int. Cl.[5] ................................................ H02H 9/06

[52] U.S. Cl. ........................................ 379/327; 337/32; 379/332

[58] Field of Search ........................ 379/327, 331, 332; 337/32, 33, 34; 361/119, 124

[56] References Cited

U.S. PATENT DOCUMENTS 4,422,121 12/1983 Baumbuch ........................ 337/32 X 4,573,100 2/1986 Fasano ............................. 337/32 X

*Primary Examiner*—James L. Dwyer

*Attorney, Agent, or Firm*—Charles E. Temko

[57] ABSTRACT

An individual telephone subscriber circuit module for use with laminar type connector blocks employing conventional three-element gas tubes of diameter greater than the thickness of an individual lamina. The module houses two gas tubes in side-by-side relation and straddles two adjacent laminae on the block to protect a pair of adjacent circuits.

1 Claim, 3 Drawing Sheets

PROTECTOR MODULE FOR LAMINAR TYPE TELEPHONE BLOCKS

BACKGROUND OF THE INVENTION

This invention relates generally to the field of telephony, and more particularly to an improved individual subscriber circuit module for use with laminar type connector blocks of a type disclosed in U.S. Pat. No. 4,813,071 dated Mar. 14, 1989 and assigned to the same assignee as the present application.

In laminar block construction, there are provided a plurality of juxtaposed laminae each mounting plural insulation displacement contacts in coplanar relation which project laterally at an angle with respect to the longitudinal axis of the laminae. The laminae are usually only one quarter inch thick, and afford high circuit density. However, it has proven difficult to provide a suitable detachable heavy duty circuit protector module for such construction.

In copending application Ser. No. 306,084, filed Feb. 6, 1989, under the title Laminary Type Telephone Block, said application being assigned to the same assignee as the present application, there is described a plurality of various modules of corresponding thickness for use with laminar block construction. Unfortunately, in the case of a subscriber circuit protector module resort must be made to a specialized gas tube assembly utilizing two two element gas tubes in coplanar relation for each protected circuit in order to maintain the thickness of the module at the same dimension as that of the engaged lamina. This construction has proven rather expensive to manufacture because of the specialized gas tubes employed and accompanying hardware, giving rise to the desirability of a simplified approach to the problem.

SUMMARY OF THE INVENTION

Briefly stated, the invention contemplates the provision of an improved protector module of the type described in which the above-mentioned disadvantage has been substantially eliminated. To this end, the disclosed embodiment contains protective circuitry for a pair of juxtaposed subscriber circuit appearances located in adjacent lamina in the protector block. The module is of a thickness substantially twice that of the individual laminae enabling the housing to contain a pair of conventional three-element gas tubes in side-by-side parallel relation with contacts leading from each gas tube to a single circuit appearance on each lamina. The contacts are separated from each other so that the operation of one gas tube will not affect that of the other gas tube. In the event of a substantial circuit overload, the generation of heat within either of the gas tubes will melt a fusible element forming a fail safe means to provide a positive grounding action. This will occur even if the gas tube itself misfunctions.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
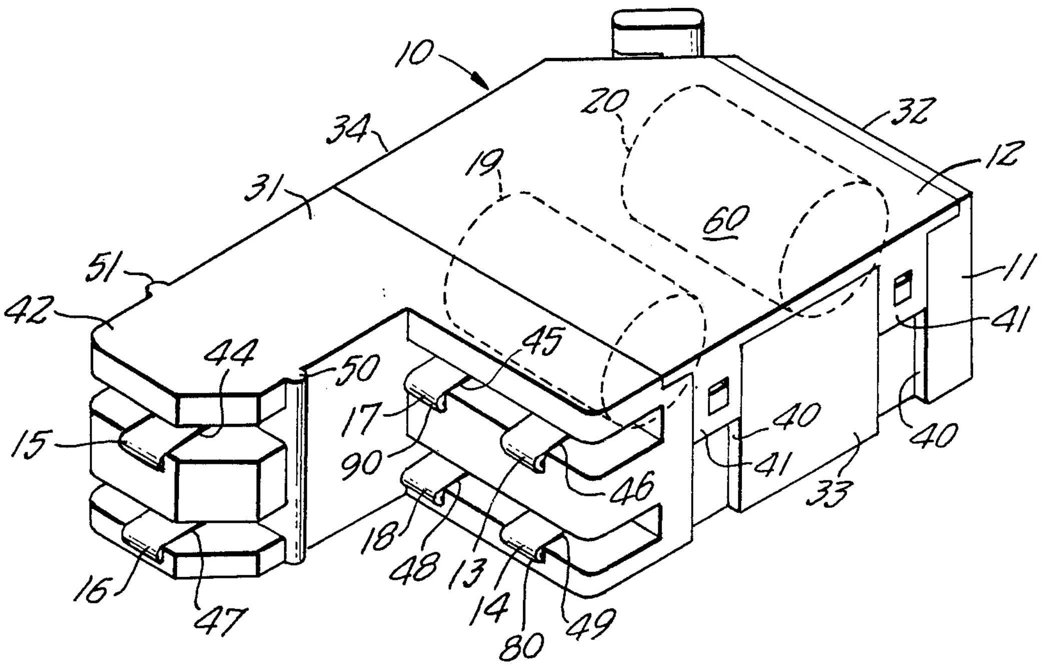
FIG. 1 is a view in perspective of an embodiment of the invention.
Figure 2:
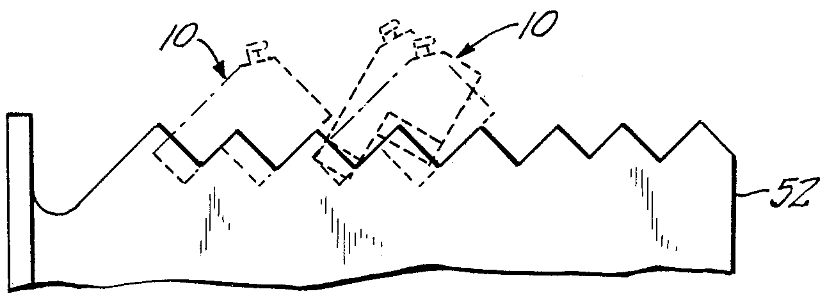
FIG. 2 is a fragmentary top plan view of a laminar type telephone protector block with a pair of protector modules in installed condition thereon.
Figure 3:
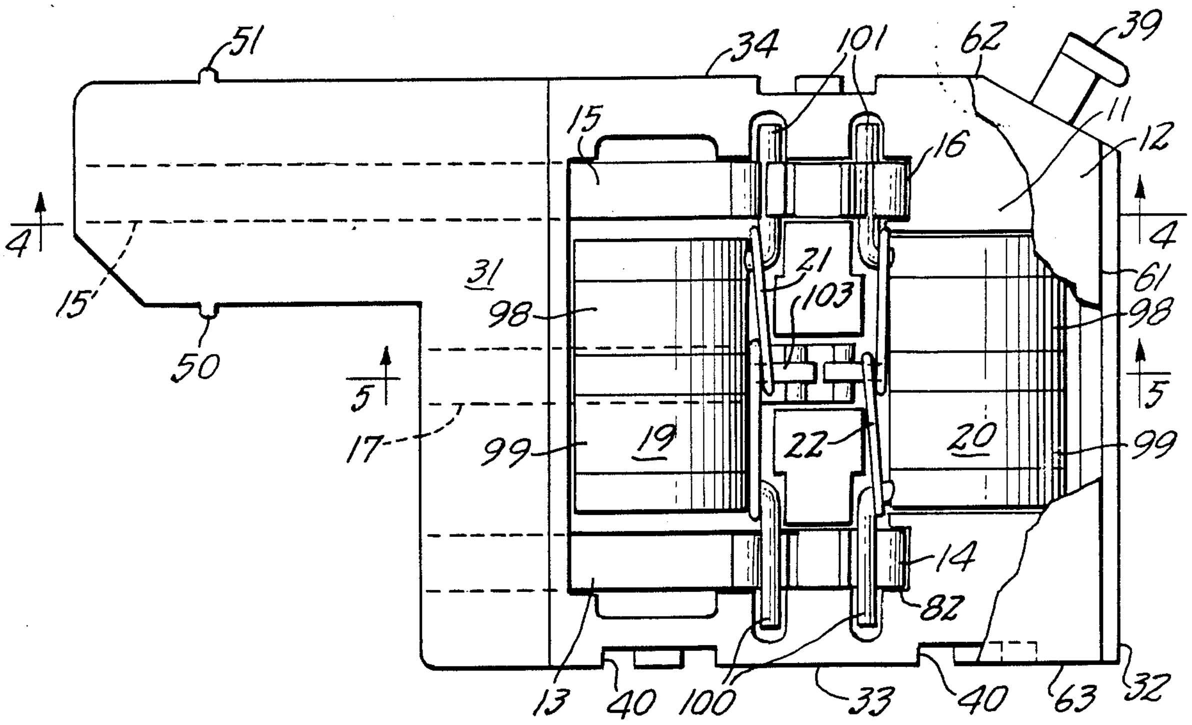
FIG. 3 is a top plan view of the embodiment with a cover member removed for purposes of clarity.
Figure 4:
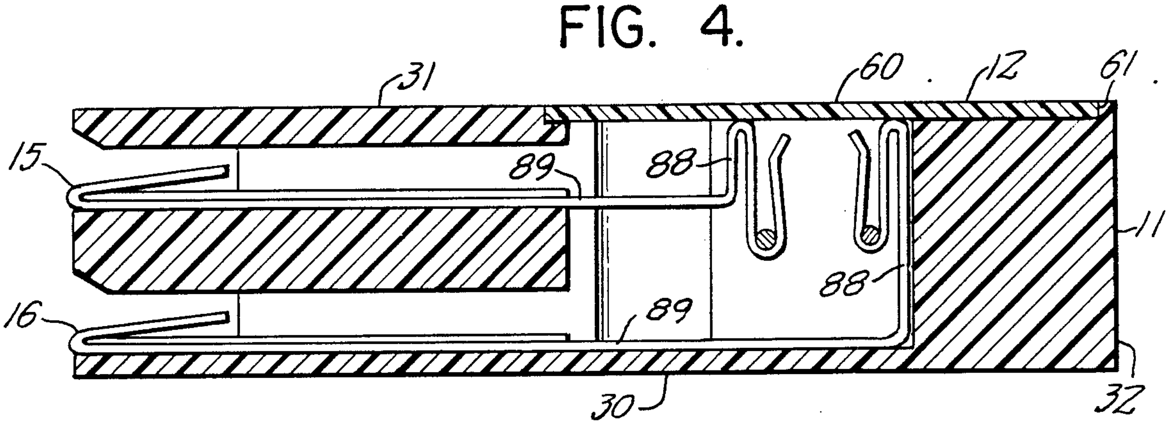
FIG. 4 is a longitudinal sectional view as seen from the plane 4—4 in FIG. 3.
Figure 5:
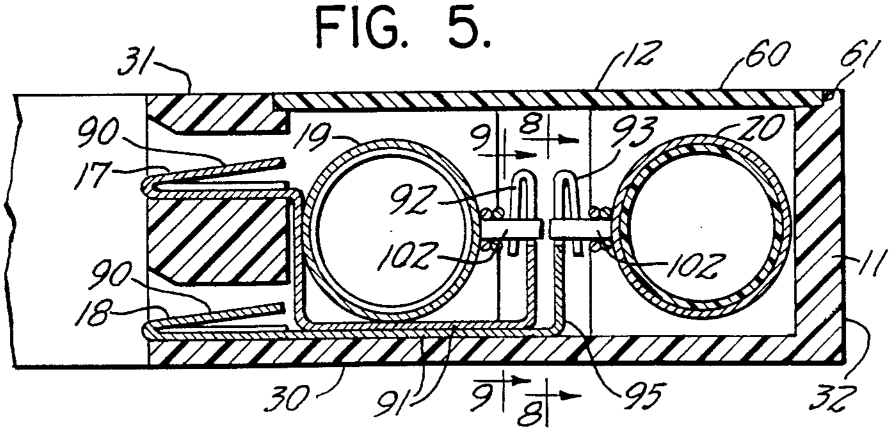
FIG. 5 is a longitudinal sectional view as seen from the plane 5—5 in FIG. 3.
Figure 9:
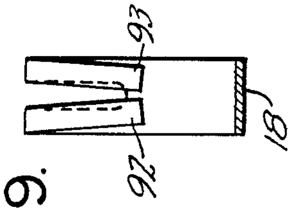
FIG. 9 is a fragmentary opposite end elevational view.
Figure 8:
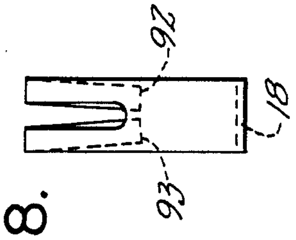
FIG. 8 is an end elevational view of a ground contact
Figure 10:
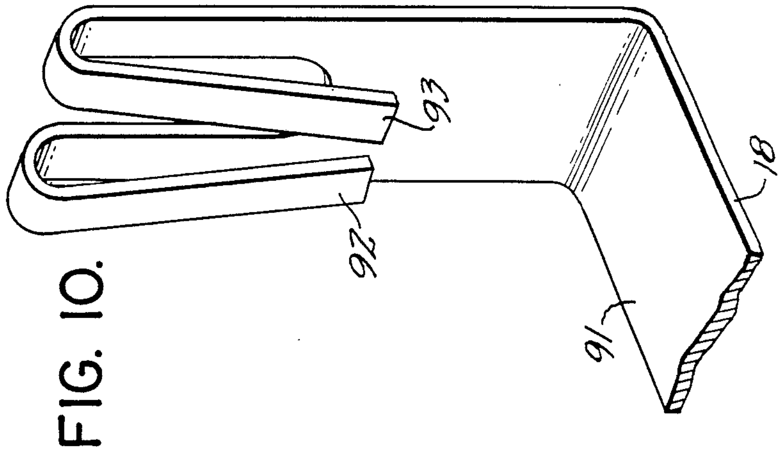
FIG. 10 is an enlarged fragmentary perspective view of an inner end of the ground contact.
Figure 6:
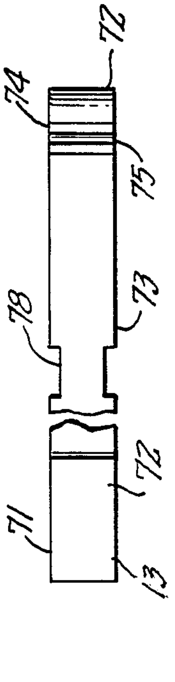
FIG. 6 is a top plan view of a tip or ring contact.
Figure 7:
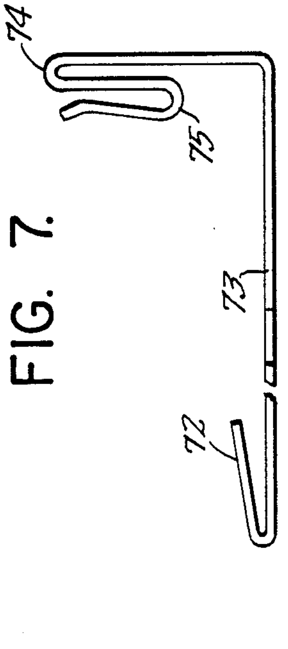
FIG. 7 is a side elevational view as seen from the lower portion of FIG. 6.

In accordance with the invention, the device (FIGS. 1–4), generally indicated by reference character 10, comprises broadly: a housing element 11 and accompanying cover element 12, a first tip contact 13, a first ring contact 14, a second tip contact 15, a second ring contact 16, a first ground contact 17, a second ground contact 18, a first and second three element gas tubes 19 and 20, and first and second fail-safe elements 21 and 22.

The housing element 11 is of generally rectangular configuration, and includes a lower wall 30, an upper wall 31, a rear wall 32, first and second side walls 33 and 34, and a medially positioned wall 35. These walls define first and second transversely extending chambers 37 and 28, and support a handle member 39 which facilitates disengagement with a block (See FIG. 2). Recesses 40 permit access to locking tabs 41 for securing the cover element 12.

A forward portion 42 of the housing is of solid cross section, and forms a plurality of channels 44, 45, 46, 47, 48 and 49, the channels 44–46 being disposed in coplanar relation, with the channels 47–49 being disposed in a second parallel plane. Locking projections 50 and 51 provide for engagements in corresponding detents (not shown) to maintain the module in engaged condition upon the block 52.

The cover element 12, like the housing element 11, is most conveniently formed as a synthetic resinous injection molding, and includes an upper wall 60, having a rear edge 61 and side edges 62 and 63 which form openings 64 corresponding to the tabs 41 for convenient engagement.

The first tip contact 13 is preferably formed as a metallic stamping from copper or brass, and includes an outer terminal 71 forming a resilient bend portion 72 which engages a corresponding insulation displacement contact in the block 52. A rectilinear segment 73 communicates with a rear terminal 74 including resilient segment 75 adapted to contact a wire extension on an end electrode 100 of a gas tube 20. Anchoring recesses 78 correspond to molded projections on the housing element 11 for anchoring the contact in position within the housing.

The first ring contact 14 is essentially similar, although slightly longer, and includes an outer terminal 80, a rectilinear segment 81 and a rear terminal 82.

The tip and ring contacts 15 and 16 are also similar, but include an offset portion 88 in the otherwise rectilinear segment 89 (See FIG. 4) of a length corresponding to the distance between the first and second planes in which the channels 44–49 are positioned.

The ground contacts 17 and 18 are also similar, each including an outer terminal 90, an elongated segment 91, and resilient portions 92 and 93 which are adapted to contact the center electrode 103 of a respective gas tube. The contact 17 also includes a corresponding offset portion 95.

The gas tubes 19 and 20 are known and conventional, each including first and second gas retaining chambers 98 and 99, outer end electrodes 100 and 101 each having a wire extension, and a center or medially disposed electrode 102.

The fail-safe elements 21 and 22 are similar to those described in copending application Ser. No. 345,446 filed May 1, 1989, and assigned to the same assignee as the instant application, the teachings of which are incorporated herein by reference.

We wish it to be understood that we do not consider the invention to be limited to the precise details of structure shown and set forth in this specification, for obvious modifications will occur to those skilled in the art to which the invention pertains.

We claim:

1. An improved telephone subscriber circuit protector module for use with laminar type blocks comprising: a housing element having a principal longitudinal axis defining a transversel oriented recess therein, a pair of three-element gas tubes positioned within said recess, each gas tube including first and second gas chambers, first and second end electrodes, and a medially disposed electrode communicating with said gas chambers; said housing having first, second and third channels disposed in a first plane, and fourth, fifth and sixth channels disposed in a second plane in spaced parallel relation with respect to said first plane; first and second tip contacts and aground contact positioned in said first, second and third channels, respectively, and communicating respectively with first and second end electrodes and said medially disposed electrode on one of said gas tubes; first and second ring contacts and a ground contact positioned in said fourth, fifth and sixth channels, respectively, and communicating with said first and second end electrodes and said medially disposed electrode on the other of said gas tubes.

* * * * *